(12) United States Patent
Onizuka (10) Patent No.: US 10,199,689 B2
(45) Date of Patent: Feb. 5, 2019

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Hiroshi Onizuka, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/119,050

(22) PCT Filed: Feb. 10, 2015

(86) PCT No.: PCT/IB2015/000126
§ 371 (c)(1),
(2) Date: Aug. 15, 2016

(87) PCT Pub. No.: WO2015/121731
PCT Pub. Date: Aug. 20, 2015

(65) Prior Publication Data
US 2017/0054179 A1  Feb. 23, 2017

(30) Foreign Application Priority Data
Feb. 17, 2014  (JP) ................................ 2014-027614

(51) Int. Cl.
*H01M 10/0568* (2010.01)
*H01M 4/133* (2010.01)
(Continued)

(52) U.S. Cl.
CPC ....... *H01M 10/0568* (2013.01); *H01M 4/133* (2013.01); *H01M 4/366* (2013.01); *H01M 4/485* (2013.01); *H01M 4/583* (2013.01); *H01M 4/622* (2013.01); *H01M 4/625* (2013.01); *H01M 4/661* (2013.01); *H01M 10/052* (2013.01);
(Continued)

(58) Field of Classification Search
None
See application file for complete search history.

(56) References Cited

U.S. PATENT DOCUMENTS

| 2012/0308881 A1 | 12/2012 | Tokuda et al. |
| 2014/0239963 A1 | 8/2014 | Nakano et al. |

(Continued)

FOREIGN PATENT DOCUMENTS

| JP | 2007-250288 A | 9/2007 |
| JP | 2011-187440 A | 9/2011 |

(Continued)

*Primary Examiner* — Wyatt P McConnell
(74) *Attorney, Agent, or Firm* — Sughrue Mion, PLLC (57) ABSTRACT

The present invention provides a nonaqueous electrolyte secondary battery configured such that a positive electrode, a negative electrode, and a nonaqueous electrolyte are accommodated in a battery case. The battery includes lithium bis(oxalato)borate (LiBOB) at least at the time of assembly of the battery. The negative electrode includes a film derived from the LiBOB and containing a boron atom (B) and a carbonate ion ($CO_3^{2-}$). A ratio (mc/mb) of a molar content mc of the carbonate ion to a molar content mb of the boron atom is 4.89 or less. In a preferred aspect, when a molar content A of the LiBOB is A (mmol) and a remaining space volume in the battery case is V ($cm^3$) at the time of the assembly, a ratio A/V is 0.053 or less.

5 Claims, 2 Drawing Sheets (51) Int. Cl.
*H01M 4/36* (2006.01)
*H01M 10/052* (2010.01)
*H01M 4/485* (2010.01)
*H01M 4/583* (2010.01)
*H01M 4/62* (2006.01)
*H01M 4/66* (2006.01)
*H01M 10/0525* (2010.01)

(52) U.S. Cl.
CPC .................. *H01M 10/0525* (2013.01); *H01M 2300/0025* (2013.01); *Y02T 10/7011* (2013.01)

(56) References Cited

U.S. PATENT DOCUMENTS

2014/0329141 A1 11/2014 Onizuka et al.
2015/0207147 A1 7/2015 Nagai et al.

FOREIGN PATENT DOCUMENTS

| JP | 2012-256439 A | 12/2012 |
| JP | 2013-110022 A | 6/2013 |
| JP | 2014-011065 A | 1/2014 |
| WO | 2013/065223 A1 | 5/2013 |
| WO | 2013/076893 A1 | 5/2013 |
| WO | 2014/002611 A1 | 1/2014 |

NONAQUEOUS ELECTROLYTE SECONDARY BATTERY

BACKGROUND OF THE INVENTION

1. Field of the Invention

The present invention relates to a nonaqueous electrolyte secondary battery. More specifically, the present invention relates to a nonaqueous electrolyte secondary battery including a film on a surface of a negative electrode.

2. Description of Related Art

In recent years, a nonaqueous electrolyte secondary battery such as a lithium-ion secondary battery has been used as a so-called portable power supply for a PC, a portable terminal, or the like, and a vehicle drive power supply. Particularly, the lithium-ion secondary battery that is lightweight and has a high energy density is preferably used as a high-output power supply for driving a vehicle such as an electric vehicle or a hybrid vehicle.

In such a nonaqueous electrolyte secondary battery, an nonaqueous electrolyte is partially decomposed at the time of first charging, so that a film (SEI film: Solid Electrolyte Interface) made of its decomposition products is formed on a surface of a negative electrode. The SEI film grows excessively due to repetition of charging and discharging, which increases a resistance of the negative electrode. This may cause a decrease in battery performance. As prior art documents to deal with such a problem, there are International Publication WO 2014/002611, Japanese Patent Application Publication No. 2012-256439 (JP 2012-256439 A), and Japanese Patent Application Publication No. 2013-110022 (JP 2013-110022 A). These patent documents disclose such a technique that a nonaqueous electrolyte includes lithium bis(oxalato)borate (LiBOB) as a film-forming agent, and a film derived from the LiBOB is formed on a surface of a negative electrode by a charging process.

SUMMARY OF THE INVENTION

The technique can restrain excessive growth of an SEI film, thereby making it possible to improve durability of a battery. However, the film derived from the LiBOB is a resistive element. In view of this, as for the nonaqueous electrolyte secondary battery used for a vehicle, which should have high input-output characteristics, it is highly requested that the film derived from the LiBOB has a low resistance. The present invention provides a nonaqueous electrolyte secondary battery which includes a low-resistance and highly durable film on a surface of a negative electrode and which is able to exhibit higher battery characteristics (e.g., with a low battery resistance and with excellent durability).

The inventors repeated examination from various angles to solve the above problem. As a result, the inventors conceived of adjusting a composition of the film derived from the LiBOB. The inventors hereby have accomplished the present invention as a result of diligent study. The invention described herein provides a nonaqueous electrolyte secondary battery configured such that a positive electrode, a negative electrode, and a nonaqueous electrolyte are accommodated in a battery case. The battery includes lithium bis(oxalato)borate (LiBOB) at least at the time of assembly of the battery. The negative electrode includes a film derived from the LiBOB and containing a boron atom (B) and a carbonate ion ($CO_3^{2-}$). A ratio (mc/mb) of a molar content mc of the carbonate ion to a molar content mb of the boron atom is equal to or less than 4.89.

Figure 1:
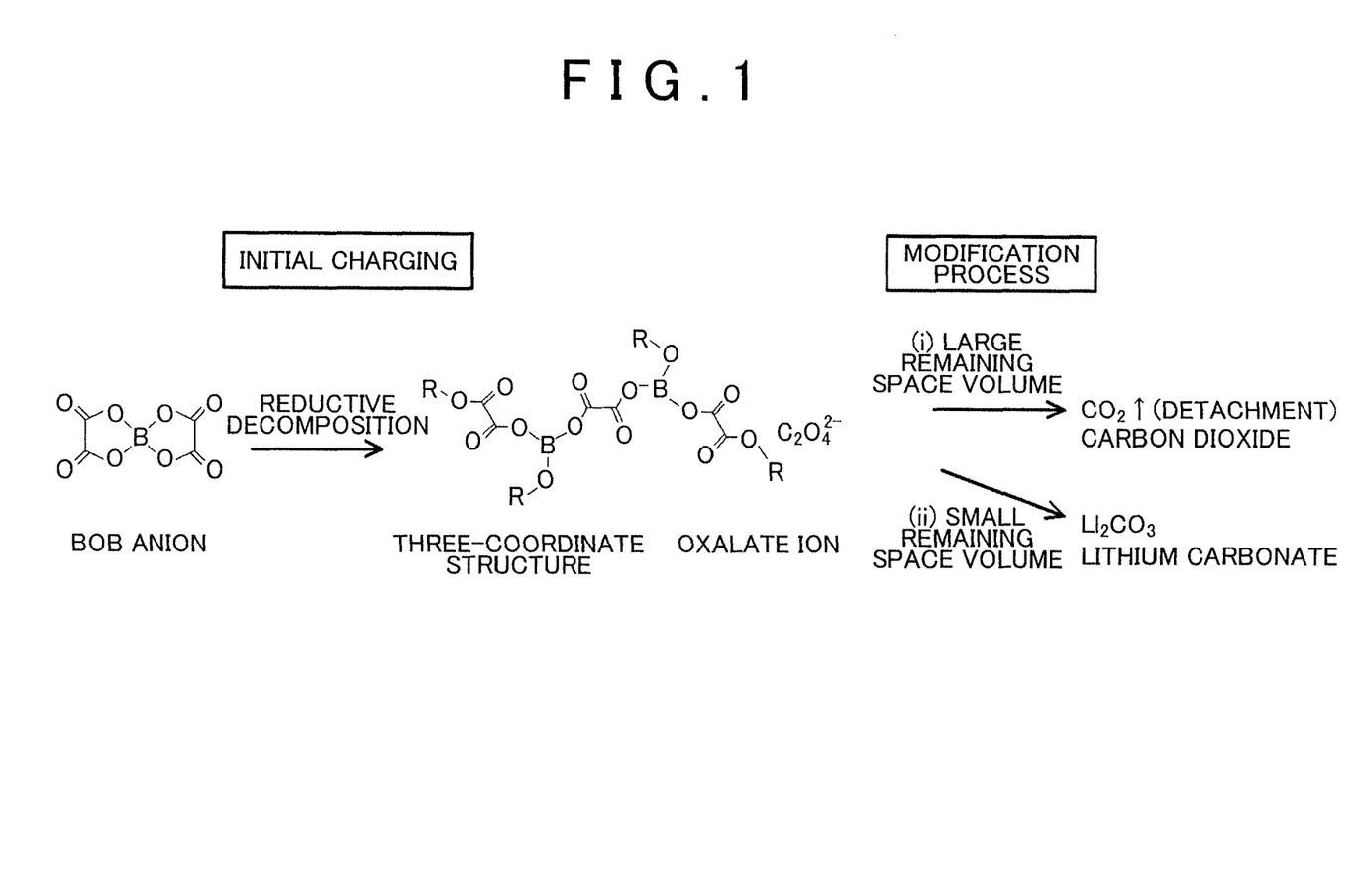
FIG. 1 is an explanatory view to describe formation of a film derived from LiBOB.

Since the film derived from the LiBOB is formed on a surface of the negative electrode, it is possible to highly restrain reductive decomposition of the nonaqueous electrolyte. Consequently, even if charging and discharging is repeated for a long term, for example, it is possible to maintain a high capacity retention rate. Further, by adjusting a composition of the film derived from the LiBOB to the above range of the ratio mc/mb, it is possible to restrain, to a minimum, an increase in resistance due to film formation. That is, as shown in the explanatory view of FIG. 1, an anionic part (BOB anion) of the LiBOB added at the time of the assembly is reduced and decomposed on a negative electrode during the charging, and is attached (deposited, adsorbed) on a surface of the negative electrode, as a film containing a stable B element. The film typically has a three-coordinate structure in which three oxygen atoms (O) are coordinated to a boron atom (B) as a central atom. This can stabilize an interface between the negative electrode and the nonaqueous electrolyte, thereby making it possible to restrain capacity deterioration. However, as shown in the explanatory view of FIG. 1, the film typically contains high-resistance oxalate ions ($C_2O_4^{2-}$). Accordingly, a resistance of the negative electrode tends to increase, although durability is improved. In view of this, in the technique disclosed herein, the oxalate ions in the film are detached as carbon dioxide ($CO_2$), as shown in (i) of FIG. 1. Hereby, it is possible to adjust a composition of the film derived from the LiBOB to the above range of the ratio mc/mb, so that a low-resistance film can be achieved. As a result, it is possible to attain both high durability and high input-output characteristics, which are incompatible with each other.

The "molar content mb of the boron atom" can be measured by a general ICP (Inductively Coupled Plasma) emission analysis technique. Further, the "molar content mc of the carbonate ion" can be measured by a general ion chromatography (IC) technique. Note that these quantitative methods will be described later more specifically.

In a preferred aspect of the nonaqueous electrolyte secondary battery disclosed herein, when a molar content of the lithium bis(oxalato)borate is A (mmol) and a remaining space volume in the battery case is V ($cm^3$) at the time of the assembly, a ratio (A/V) of A to V is equal to or less than 0.053. According to the examination of the inventors, the range of mc/mb can be adjusted appropriately by controlling the ratio (A/V) of an addition amount A of the LiBOB to the remaining space volume V. That is, by ensuring a sufficient remaining space volume V to the molar content A of the LiBOB, the oxalate ions in the film can be smoothly detached from the negative electrode as carbon dioxide ($CO_2$). This can achieve a low-resistance film and restrain an increase in resistance of the negative electrode precisely.

In a case where the LiBOB is added to the nonaqueous electrolyte, for example, the "molar content A (mmol) of the LiBOB" can be found from a product obtained by multiplying a concentration (mmol/g) of the LiBOB in the nonaqueous electrolyte by a filling amount (g) of the nonaqueous electrolyte. Further, the "remaining space volume V ($cm^3$) in the battery case" can be found by subtracting a total volume of all constituents accommodated in the battery case from a volume of the battery case. More specifically, the "remaining space volume V ($cm^3$) in the battery case" can be found by such a subtraction (V1−V2) that a sum total V2 of volumes of solids (e.g., the positive electrode, the negative electrode, the separator) and liquid (e.g., the nonaqueous electrolyte) accommodated in a sealed part of the battery case is subtracted from a total volume V1 of the sealed part of the battery case in which to accommodate the positive and negative electrodes and the nonaqueous electrolyte. Note that a solid volume can be measured by the Archimedes's method, for example.

In a preferred aspect of the nonaqueous electrolyte secondary battery disclosed herein, the ratio mc/mb is equal to or less than 4.00. According to such an aspect, it is possible to restrain the increase in resistance along with the formation of the film at a further higher level. This makes it possible to attain more excellent input-output characteristics.

In a preferred aspect of the nonaqueous electrolyte secondary battery disclosed herein, the ratio A/V is equal to or less than 0.020. According to such an aspect, it is possible to stably restrain the increase in resistance along with the formation of the film at a further higher level. This makes it possible to attain more excellent input-output characteristics.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes a preferred embodiment of the present invention. A matter that is not particularly mentioned in the present specification but is necessary for execution of the present invention can be understood as a design matter of a person skilled in the art based on conventional techniques in the art. The present invention can be performed based on what is described in the present specification and a common general technical knowledge in the art.

A nonaqueous electrolyte secondary battery disclosed herein is configured such that a positive electrode, a negative electrode, and a nonaqueous electrolyte are accommodated in a battery case. The negative electrode includes a film derived from lithium bis(oxalato)borate and containing a boron atom (B) and a carbonate ion ($CO_3^{2-}$). The negative electrode is characterized in that a ratio (mc/mb) of a molar content mc of the carbonate ion to a molar content mb of the boron atom is 4.89 or less. Configurations other than the above are not limited in particular, and can be determined arbitrarily according to various purposes.

Such a battery can be manufactured by a method including: (1) assembly of a battery cell; (2) initial charging; and (3) a modification process, for example. The following describes each of the steps sequentially.

<1. Assembly of Battery cell> In the assembly of a battery cell, an electrode body in which a positive electrode and a negative electrode are opposed to each other, and a nonaqueous electrolyte including lithium bis(oxalato)borate (LiBOB) are accommodated in a battery case.

The positive electrode is not limited in particular as long as the positive electrode contains a positive-electrode active material. The positive electrode typically includes a positive current collector, and a positive-electrode active material layer adhered to the current collector and containing the positive-electrode active material. As the positive current collector, a conductive member made of metal (e.g., aluminum or nickel) having a good electrical conductivity can be preferably used.

As the positive-electrode active material, one or more types selected from various well-known materials that can be used as a positive-electrode active material of a nonaqueous electrolyte secondary battery can be employed. Preferable examples thereof include layered and spinel lithium composite metal oxides (e.g., $LiNiO_2$, $LiCoO_2$, $LiMn_2O_4$, $LiFeO_2$, $LiNi_{0.33}Co_{0.33}Mn_{0.33}O_2$, $LiNi_{0.5}Mn_{1.5}O_4$, $LiCrMnO_4$) and olivine materials (e.g., $LiFePO_4$). Especially, from the viewpoint of thermostability and energy density, a lithium nickel cobalt manganese composite metal oxide having a layered structure containing Li, Ni, Co and Mn as constituent elements can be preferably used.

The positive-electrode active material layer may contain one or more materials usable as a component of a positive-electrode active material layer in a general nonaqueous electrolyte secondary battery as needed, in addition to the positive-electrode active material. Examples of such a material include a conductive material and a binder. As the conductive material, carbon materials such as various types of carbon black (e.g., acetylene black and Ketjen black), active carbon, graphite, and carbon fiber can be preferably used, for example. Further, as the binder, a halogenation vinyl resin such as polyvinylidene fluoride (PVdF), polyalkylene oxide such as polyethylene oxide (PEO) can be preferably used, for example. In addition, various additives such as a dispersing agent and a thickener may be further contained.

The negative electrode is not limited in particular as long as the negative electrode contains a negative-electrode active material. The negative electrode typically includes a negative current collector, and a negative-electrode active material layer adhered to the current collector and containing the negative-electrode active material. As the negative current collector, a conductive member made of metal (e.g., copper or nickel) having a good electrical conductivity can be preferably used.

As the negative-electrode active material, one or more types selected from various well-known materials that can be used as a negative-electrode active material of a nonaqueous electrolyte secondary battery can be employed. Preferable examples thereof include graphite, hardly graphitized carbon (hard carbon), easily graphitized carbon (soft carbon), carbon nano-tube, and carbon materials having structures obtained by combining them. Especially, from the viewpoint of energy density and durability, a carbon material (amorphous carbon coating graphite) in which amorphous carbon is provided on a surface of natural graphite (black lead) can be preferably used. Properties of the negative-electrode active material are not limited in particular. However, the negative-electrode active material is typically particulate or powdered. An average particle diameter ($D_{50}$ particle diameter, volumetric basis) of such a particulate negative-electrode active material based on a laser diffraction-light scattering method can be 50 μm or less (typically, 20 μm or less, e.g., 1 to 20 μm, preferably 5 to 15 μm). Further, a specific surface area based on a BET method can be 1 $m^2$/g or more (typically, 2.5 $m^2$/g or more, e.g., 2.8 $m^2$/g or more), but 10 $m^2$/g or less (typically, 5 $m^2$/g or less, e.g., 4.9 $m^2$/g or less). The negative-electrode active material that satisfies one or two of the above properties can exhibit still higher input-output characteristics.

The negative-electrode active material layer may contain one or more materials usable as a component of a negative-electrode active material layer in a general nonaqueous electrolyte secondary battery as needed, in addition to the above negative-electrode active material. Examples of such a material include a binder and a thickener. Styrene butadiene rubber (SBR), polyvinylidene fluoride (PVdF), polytetrafluoroethylene (PTFE), or the like can be preferably used as the binder, for example. Cellulose such as carboxymethyl cellulose (CMC) or methyl cellulose (MC) can be preferably used as the thickener. In addition, various additives such as a dispersing agent and a conductive material may be contained.

An appropriate content rate of the negative-electrode active material in the whole negative-electrode active material layer is approximately 50 mass % or more. Generally, it is preferable that the content rate be 90 to 99 mass % (e.g., 95 to 99 mass %). In a case where the binder is used, a content rate of the binder in the whole negative-electrode active material layer can be approximately 0.1 to 10 mass %, for example. Generally, it is preferable that the content rate be approximately 0.3 to 5 mass %. In a case where the thickener is used, a content rate of the thickener in the whole negative-electrode active material layer can be approximately 0.1 to 10 mass %, for example. Generally, it is preferable that the content rate be approximately 0.3 to 5 mass %.

A mass (basis mass) of the negative-electrode active material layer provided per unit area of the negative current collector can be around 2 to 20 mg/cm$^2$ of (typically, 4 to 15 mg/cm$^2$) per side of the negative current collector. A thickness of the negative-electrode active material layer provided per side of the negative current collector can be 20 μM or more (typically, 30 μm or more), but 100 μm or less (typically, 80 μm or less), for example. Further, a density of the negative-electrode active material layer can be 0.5 g/cm$^3$ or more (typically, 1 g/cm$^3$ or more), but 2 g/cm$^3$ or less (typically, 1.5 g/cm$^3$ or less), for example. Further, a percentage of void of the negative-electrode active material layer can be 5 volume % or more (typically, 35 volume % or more), but 50 volume % or less, for example. When one or more of the properties are satisfied, the negative-electrode active material layer can attain an energy density, an input-output density, and durability at a further higher level.

A separator is typically provided between the positive electrode and the negative electrode. Any separator can be used provided that the separator insulates the positive electrode and the negative electrode from each other, and has a retention function of the nonaqueous electrolyte and a shutdown function thereof. Preferable examples of the separator include porous resin sheets (films) made of resins such as polyethylene (PE), polypropylene (PP), polyester, cellulose, and polyamide. Especially, from the viewpoint of overcharge resistance, a polyolefin porous resin sheet (e.g., PE or PP) can be preferably used. Further, the separator may be configured such that a porous heat resistance layer is formed on one side or both sides (typically, one side) of the porous resin sheet. Such a porous heat resistance layer can be a layer containing an inorganic material (inorganic filler such as alumina particles can be preferably used) and a binder. Alternatively, the porous heat resistance layer can be a layer containing resin particles having an insulating property (e.g., particles of polyethylene, polypropylene, or the like).

The nonaqueous electrolyte typically includes a supporting electrolyte and lithium bis(oxalato)borate (LiBOB) in a nonaqueous solvent. Such a nonaqueous electrolyte exhibits a liquid state at a normal temperature (e.g., 25° C.). As a preferable example, the nonaqueous electrolyte always exhibits a liquid state under an operating environment of the battery (for example, an environmental temperature of −30° C. to 60° C.). As the nonaqueous solvent, various organic solvents used in an electrolyte of a general nonaqueous electrolyte secondary battery, such as organic solvents of carbonate, ether, ester, nitrile, sulfone, lactone, and the like, can be used. Specific examples thereof include ethylene carbonate (EC), propylene carbonate (PC), diethyl carbonate (DEC), dimethyl carbonate (DMC), ethylmethyl carbonate (EMC), and the like. One of the nonaqueous solvents can be used solely, or two or more thereof can be used in combination as appropriate. Especially, EC having a high dielectric constant, and DMC and EMC having a high oxidation potential (wide potential window) can be preferably used.

As the supporting electrolyte, a supporting electrolyte used for a general nonaqueous electrolyte secondary battery can be used selectively as appropriate, provided that the supporting electrolyte contains a charge carrier ion (e.g., lithium ion, sodium ion, magnesium ion, and the like; the lithium ion is used in the case of a lithium-ion secondary battery). In a case where the charge carrier ion is the lithium ion, lithium salts such as $LiPF_6$, $LiBF_4$, $LiClO_4$, $LiAsF_6$, $Li(CF_3SO_2)_2N$, and $LiCF_3SO_3$ can be used. A particularly preferable supporting electrolyte is $LiPF_6$.

The lithium bis(oxalato)borate (LiBOB) is an oxalate complex compound having a tetracoordinate structure in which two oxalate ions ($C_2O_4^{2-}$) are coordinated to a boron atom (B) as a central atom. When the battery cell is charged (typically, at the time of initial charging), the compound is reduced and decomposed in the negative electrode, and attached (deposited, adsorbed) to a surface of the negative electrode as a film. This can stabilize an interface between the negative electrode and the nonaqueous electrolyte.

A LiBOB concentration in the nonaqueous electrolyte is not limited in particular, and can be set appropriately according to a condition or the like of the initial charging (described later). From the viewpoint of easy preparation of the nonaqueous electrolyte, it is generally preferable to prepare the nonaqueous electrolyte so that the LiBOB concentration is about 0.01 to 0.2 mol per 1 kg of the nonaqueous electrolyte (that is, 0.01 to 0.2 mol/kg). From the viewpoint of productivity and cost, it is preferable to use a nonaqueous electrolyte with a LiBOB concentration of 0.02 to 0.15 mol/kg. Note that the manufacturing method disclosed herein employs a method in which the nonaqueous electrolyte contains the LiBOB in advance. However, the manufacturing method is not limited to this, and such a method can be employed, for example, in which the LiBOB is attached to an electrode (typically, a negative electrode) or a separator, and the LiBOB is eluted in a nonaqueous electrolyte by assembly of a battery cell.

A molar content A (mmol) of the LiBOB included in the battery case at the time of the assembly of the battery cell can be set appropriately according to a volume of the battery case, properties (e.g., a percentage of void, thickness, and the like) of the negative electrode, properties (e.g., an average particle diameter, a specific surface area, and the like) of the negative-electrode active material, and the like, for example, so that a film having a desired thickness is formed on the negative electrode. In general, as a used amount of the negative-electrode active material is larger and/or as the specific surface area of the negative-electrode active material is larger, a preferable content of the LiBOB tends to increase. In a case of a large-capacity (large-sized)

battery used for a vehicle, for example, the molar content A of the LiBOB should be about 0.1 mmol to 10 mol (e.g., 0.5 mmol to 5 mol), in general.

The battery case is a container configured to accommodate the positive electrode, the negative electrode, and the nonaqueous electrolyte therein. In order to improve a heat dissipation property or to increase an energy density, a metallic material such as aluminum can be preferably used as a material of the battery case.

In the technique disclosed herein, it is preferable to ensure that a remaining space volume V (cm$^3$) is a predetermined value or more relative to the molar content A (mmol) of the LiBOB. That is, it is preferable to satisfy A/V≤0.053. According to the examination of the inventors, when A/V largely exceeds 0.053 (in other words, when a sufficient remaining space is not ensured in the battery cell), high-resistance lithium carbonate is generated from the oxalate ions in the after-mentioned modification process, as shown in (ii) of FIG. 1. When a large amount of the lithium carbonate exists in the film, the resistance of the film is not decreased, so that an initial battery resistance tends to increase. In view of this, when A/V≤0.053 (preferably A/V≤0.030, more preferably A/V≤0.020, further daringly A/V≤0.015) is satisfied, it is possible to promote detachment of the oxalate ions as carbon dioxide, as shown in (i) of FIG. 1. Accordingly, the film can have a sufficiently low resistance. Note that a lower limit of A/V is not limited in particular, but A/V can be set to 0.001≤A/V (typically, 0.002≤A/V), for example.

<2. Initial Charging> In the initial charging, a charging process is performed between the positive electrode and the negative electrode at least once. The charging is performed so that a potential (vs. Li/Li$^+$) of the negative electrode becomes lower than a reduction potential of the LiBOB. As a preferable example, the charging process is performed until the potential of the negative electrode becomes lower than the reduction potential of the LiBOB by 0.05 V or more (typically, 0.1 V or more, e.g., 0.3 V or more, particularly 0.5 V or more). For example, the charging may be performed until a voltage (typically, a maximum achievable voltage) between positive and negative terminals reaches approximately 3.8 to 4.3 V (typically, 3.9 to 4.1 V). Hereby, the LiBOB is electrically decomposed (reduced and decomposed) in the negative electrode, so that a film derived from the LiBOB (typically, a film containing the boron atom and the oxalate ion) is formed on the surface of the negative electrode. Note that the film formed on the surface of the negative electrode may contain other components (e.g., nonaqueous solvent) constituting the nonaqueous electrolyte and decomposition products thereof, as well as the components derived from LiBOB.

The charging process may be performed in such a manner (CC charging) that the charging is performed at a constant current from a charging start until a potential of the negative electrode reaches a predetermined value (until a voltage between positive and negative terminals reaches a predetermined value). Alternatively, the charging process may be performed in such a manner (CCCV charging) that the charging is first performed at a constant current until the predetermined potential (or the predetermined voltage), and then the charging is performed at a constant voltage. A charging rate in the CC charging is not limited in particular. However, if the charging rate is too low, efficiency of the process tends to decrease. Meanwhile, if the charging rate is too high, fineness of a film to be formed may be insufficient or the positive-electrode active material may deteriorate. In view of this, the charging rate is preferably 0.1 to 2 C (typically, 0.5 to 1.5 C), for example. This makes it possible to stably form a very fine film (that can sufficiently restrain a reaction with the nonaqueous electrolyte) in relatively short time.

Note that the charging process may be performed once, or may be repeated twice or more times with a discharge process being performed every time after the charging process. Further, other operations to promote the reductive decomposition of the LiBOB (e.g., application of a pressure or application of ultrasonic wave) can be performed together as appropriate in a range where the battery characteristics are not affected adversely.

<3. Modification Process> In the modification process, the battery cell charged as described above may be held (left) in a high-temperature area for a predetermined period. In the technique disclosed herein, a sufficient remaining space is ensured in the battery cell. Accordingly, by performing the modification process, an oxalate ion component can be appropriately detached, as carbon dioxide, from the film derived from the LiBOB which film is formed on the surface of the negative electrode. This makes it possible to reduce a resistance of the film. As a result, it is possible to realize a battery having a low initial resistance and having excellent input-output characteristics. Further, in a case where unexpected foreign metal exists in the battery cell due to a manufacturing process, raw materials, or the like, for example, dissolution of the foreign metal can be promoted by the modification process. This makes it possible to more precisely detect malfunction (slight short circuit) before shipment of the battery.

From the viewpoint of improving the productivity, it is preferable that a voltage of the battery cell maintain a SOC of 50% or more (typically, 60% or more, e.g., 80% or more) over the process. Further, from the viewpoint of restraining deterioration of the battery in the modification process, the SOC of the battery cell is suitably maintained at 100% or less, in general. Further, from the viewpoint of shortening a process time and preventing the deterioration of the battery cell (e.g., deterioration of the positive-electrode active material, decomposition of the nonaqueous solvent), a temperature during the modification process should be approximately 40° C. or more (typically, 50° C. or more, e.g., 60° C. to 80° C.), in general. Further, a time for the modification process (a time during which the battery cell adjusted to the above SOC is maintained at the above temperature) should be set for 5 to 240 hours, preferably 10 to 180 hours. In this way, the nonaqueous electrolyte secondary battery disclosed herein can be manufactured.

The nonaqueous electrolyte secondary battery disclosed herein includes, in the negative electrode, the film derived from lithium bis(oxalato)borate and containing a boron atom (B) and a carbonate ion ($CO_3^{2-}$). A ratio of a molar content mc of the carbonate ion to a molar content mb of the boron atom satisfies mc/mb≤4.89. Generally, as an addition amount of the LiBOB is increased, the effect to restrain deterioration in capacity is improved. However, on the other hand, an initial resistance may be increased. In the technique disclosed herein, the content of the carbonate ion (that can be present in the form of lithium carbonate ($Li_2CO_3$) in the film), which is a high-resistance component, is reduced so as to satisfy mc/mb≤4.89 (preferably mc/mb≤4.00, more preferably mc/mb≤3.50). As a result, even at the same addition amount of the LiBOB, it is possible to restrain, to a minimum, an increase in the resistance along with the assembly of the film.

The content mb (mmol/cm$^2$) of the boron atom contained per unit area of the negative electrode (the negative-electrode active material layer) is not limited in particular. However, from the viewpoint of stably keeping the interface with the nonaqueous electrolyte and from the viewpoint of reducing the resistance of the negative electrode, the content of the boron atom should be adjusted to approximately $1\times10^{-5}$ to $2\times10^{-3}$ mmol/cm$^2$ (e.g., $1\times10^{-4}$ to $1\times10^{-3}$ mmol/cm$^2$), in general. Further, the content mc (mmol/cm$^2$) of the carbonate ion contained per unit area of the negative electrode (the negative-electrode active material layer) is not limited in particular. However, from the viewpoint of attaining a low resistance, the content of the carbonate ion should be adjusted to approximately $5\times10^{-3}$ mmol/cm$^2$ or less, in general.

Note that the "molar content mb of the boron atom" can be measured by an ICP emission analysis technique. More specifically, the battery is completely discharged first, and then disassembled to take out the negative electrode therefrom. Subsequently, the negative electrode (the negative-electrode active material layer) thus taken out is immersed in an appropriate solvent (e.g., EMC) so as to wash the negative electrode. After that, the negative electrode is cut into an appropriate size (e.g., approximately 102 mm×50 mm), so as to obtain a measurement sample. Subsequently, the measurement sample is immersed in an acid solution (e.g., water solution of sulfuric acid) for a predetermined time (e.g., about 1 to 30 minutes). Thus, a film component (a boron atom: B) as a measurement subject is dissolved (eluted) in the acid solution. The solution is subjected to ICP emission measurement, so as to calculate a content (mmol) of the boron atom. Then, a measurement value (mmol) obtained hereby is divided by an area (cm$^2$) of the negative-electrode active material layer thus subjected to the measurement. Consequently, the content mb (mmol/cm$^2$) of the boron atom contained per unit area of the negative electrode (the negative-electrode active material layer) can be found.

Further, the "molar content mc of the carbonate ion" can be measured by an ion chromatography (IC) technique. More specifically, the battery is completely discharged first, and then disassembled to take out the negative electrode therefrom. Subsequently, the negative electrode (the negative-electrode active material layer) thus taken out is immersed in an appropriate solvent (e.g., EMC) so as to wash the negative electrode. After that, the negative electrode is cut into an appropriate size (e.g., $\phi$40 mm), so as to obtain a measurement sample. Subsequently, the measurement sample is immersed in ion-exchange water for a predetermined time (e.g., about 1 to 30 minutes). Thus, a film component (carbonate ion: $CO_3^{2-}$) as a measurement subject is dissolved (eluted) in the water. The water is subjected to IC measurement, so as to calculate a content (mmol) of the carbonate ion. Then, a measurement value (mmol) obtained hereby is divided by an area (cm$^2$) of the negative-electrode active material layer thus subjected to the measurement. Consequently, the content mc (mmol/cm$^2$) of the carbonate ion contained per unit area of the negative electrode (the negative-electrode active material layer) can be found.

As described above, the LiBOB existing (typically in the nonaqueous electrolyte) at the time of the assembly of the battery cell is reduced and decomposed by initial charging in the negative electrode, and attached (deposited, adsorbed) to the surface of the negative electrode as a film. Because of this, in the battery after the charging and discharging (typically after the initial charging, e.g., after the modification process), the LiBOB does not need to remain in the nonaqueous electrolyte.

The nonaqueous electrolyte secondary battery disclosed herein is usable for various purposes. The nonaqueous electrolyte secondary battery can appropriately exhibit an effect of the film formed on the surface of the negative electrode, and attain high battery characteristics as compared with a conventional battery. For example, the nonaqueous electrolyte secondary battery may have a low initial resistance and may be able to maintain a high energy density for a long term even if charging and discharging is repeated. Accordingly, by making use of such properties, the nonaqueous electrolyte secondary battery is preferably usable for a purpose that requests a high energy density and a high power density. More specifically, the nonaqueous electrolyte secondary battery can be preferably used as a driving power supply to be provided in a vehicle. The type of the vehicle is not limited in particular, but may be, for example, a plug-in hybrid vehicle (PHV), a hybrid vehicle (HV), an electric vehicle (EV), an electric truck, a motorized bicycle, an electric assist bicycle, a powered wheelchair, an electric railway, and the like.

The following describes some examples related to the present invention, but it is not intended to limit the present invention to the following concrete examples.

Here, 15 batteries of different remaining space volumes V (cm$^3$) in a battery cell and/or of different concentrations (mol/kg) of LiBOB in a nonaqueous electrolyte were manufactured.

[Assembly of Nonaqueous Electrolyte Secondary Battery] First, $LiNi_{0.33}CO_{0.33}Mn_{0.33}O_2$ (LNCM) as a positive-electrode active material, acetylene black (AB) as a conductive material, and polyvinylidene fluoride (PVdF) as a binder were weighted so that a mass ratio of these materials satisfied LNCM:AB:PVdF=90:8:2. Then, the materials were put into a kneading machine and kneaded while adjusting a viscosity by N-methylpyrrolidone (NMP). Thus, a positive-electrode active material slurry was prepared. The slurry was applied to a surface of elongated aluminum foil (a positive current collector). After the slurry was dried, a rolling process was performed thereon. Hereby, a positive electrode sheet having a positive-electrode active material layer on the positive current collector was manufactured.

Subsequently, amorphous carbon coating graphite (C) as a negative-electrode active material, styrene butadiene rubber (SBR) as a binder, and carboxymethyl cellulose (CMC) as a dispersing agent were put into a kneading machine so that a mass ratio of these materials satisfied C:SBR:CMC=98:1:1. The materials were kneaded while adjusting a viscosity by ion-exchange water. Thus, a negative-electrode active material slurry was prepared. The slurry was applied to a surface of elongated copper foil (a negative current collector). After the slurry was dried, a rolling process was performed thereon. Hereby, a negative electrode sheet having a negative-electrode active material layer on the negative current collector was manufactured.

The positive electrode sheet and the negative electrode sheet manufactured as such were wound with two separator sheets, and shaped in a flat shape. Thus, an electrode body was manufactured. The separator sheets used herein have a three-layer structure in which polypropylene (PP) was laminated on either side of polyethylene (PE). Then, a positive terminal and a negative terminal were attached to a cover of a battery case, and the terminals were welded to the positive current collector and the negative current collector, respectively. The positive current collector and the negative current collector were exposed in an end of the wound electrode body. The wound electrode body thus connected to the cover was accommodated in the battery case from its opening, and the opening was welded to the cover. Subsequently, a nonaqueous electrolyte was poured from an electrolyte injection hole provided in the cover. The nonaqueous electrolyte used herein was obtained as follows. A mixed solvent containing ethylene carbonate (EC), dimethyl carbonate (DMC), and ethylmethyl carbonate (EMC) such that a volume ratio thereof satisfies EC:DMC:EMC=1:1:1 was prepared. Then, $LiPF_6$ as a supporting electrolyte was dissolved in the mixed solvent so that a concentration thereof was 1 mol/L. Further, lithium bis(oxalato)borate (LiBOB) was added thereto at a concentration (mol/kg) as shown in Table 1. Battery cells of Examples 1 to 15 were assembled in this way.

[Initial Charging] Initial charging was performed on the battery cells of Examples 1 to 15 thus assembled, according to the following Procedures 1 to 2 under an environment of 25° C. Procedure 1: Charging is performed at a constant current of 1 C until a voltage reaches 4.1 V. After that, charging is performed at a constant voltage for two hours, and then stopped for ten seconds. Procedure 2: Discharging is performed at a constant current of 1 C until a voltage reaches 3.0 V. After that, discharging is performed at a constant voltage for two hours, and then stopped for ten seconds.

[Modification Process] Each of the battery cells subjected to the initial charging was then subjected to a process of modifying a film formed due to the initial charging. More specifically, each of the battery cells was adjusted to a SOC of 90% (a cell voltage of 3.97 V), and held in a constant-temperature bath of 60° C. for 150 hours. Batteries of Examples 1 to 15 were obtained in this way.

[Measurement of Initial Resistance] The batteries thus subjected to the modification process were adjusted to a SOC of 40%, and AC impedance measurement was performed under an environment of −30° C. A diameter of an arc portion of a Cole-Cole plot obtained hereby was assumed a reaction resistance (mΩ). Further, for each LiBOB concentration, a relative value of the reaction resistance was calculated where a reaction resistance for a largest space volume V in a battery was assumed 100. Obtained results are set forth in a corresponding column in Table 1.

As shown in a column of the reaction resistance of Table 1, as an addition amount A (mmol) of the LiBOB was increased, the initial resistance tended to relatively increase. This is presumably because as the addition amount A is increased, a film derived from the LiBOB, which film is formed on the surface of the negative electrode, becomes thicker. However, as shown in a column of a reaction resistance ratio in Table 1 and in FIG. 2, it is found that an increase in the initial resistance can be restrained to a minimum when a ratio (mc/mb) of a molar content mc of the carbonate ion to a molar content mb of the boron atom is set to 4.89 or less (preferably 4.00 or less, more preferably 3.50 or less, e.g., 3.00 or less). The reason thereof is presumably as follows: a film containing the carbonate ion has a relatively high resistance, and a film containing the boron atom has a relatively low resistance. That is, the molar content of the carbonate ion, which is a high-resistance component, is reduced relative to the molar content of the boron atom, which is a low resistance component, so as to satisfy mc/mb≤4.89. Here, the carbonate ion may be present in the form of lithium carbonate in the film. Hereby, it is possible to attain both a capacity deterioration suppression effect (durability increase effect) and high input-output characteristics. The above result indicates a difference between the present invention and the conventional technique.

Figure 2:
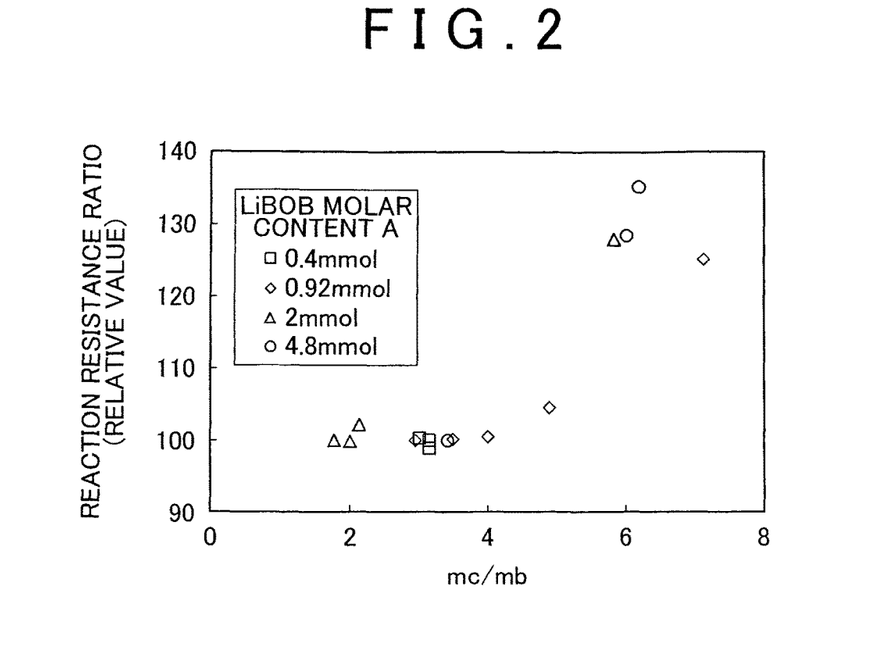
FIG. 2 is a graph showing a relationship between mc/mb and a reaction resistance ratio.

[Composition of Film on Negative Electrode Surface] After the batteries were discharged to a SOC 0%, the batteries were disassembled. Then, the molar content mb (mmol/cm$^2$) of the boron atom contained per unit area of the negative electrode (the negative-electrode active material layer) was found by the aforementioned ICP emission analysis. Further, the molar content mc (mmol/cm$^2$) of the carbonate ion ($CO_3^{2-}$) contained per unit area of the negative electrode (the negative-electrode active material layer) was found by the aforementioned ion chromatography technique. Then, the ratio (mc/mb) of the molar content mc of the carbonate ion to the molar content mb of the boron atom was calculated for each of the battery cells. Obtained results are set forth in a corresponding column in Table 1. FIG. 2 shows a relationship between mc/mb and the reaction resistance ratio, and FIG. 3 shows a relationship between A/V and the reaction resistance ratio.

Figure 3:
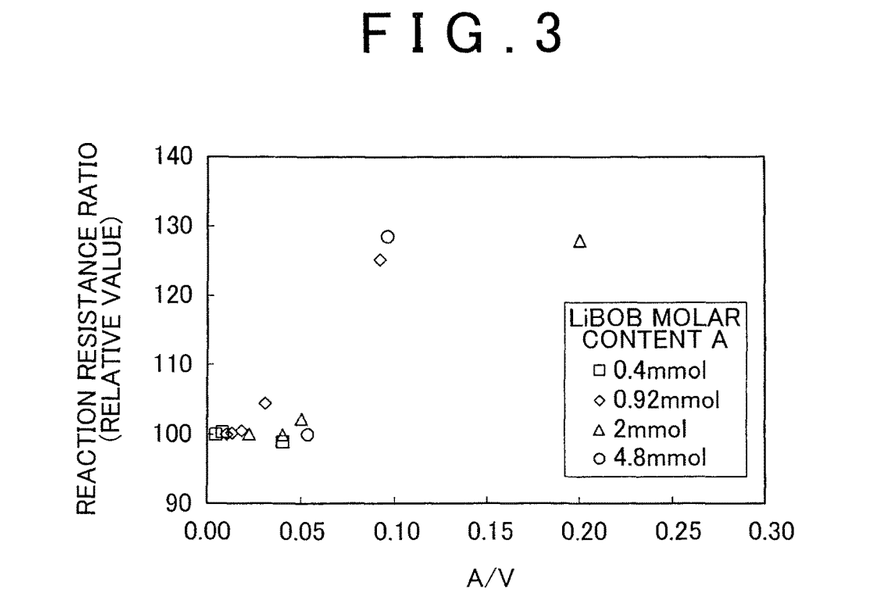
FIG. 3 is a graph showing a relationship between A/V and a reaction resistance ratio.

As shown in the column of the reaction resistance ratio in Table 1 and in FIG. 3, it is found that when a ratio (A/V) of the molar content A of the LiBOB to the remaining space volume V is 0.053 or less (e.g., 0.040 or less, preferably 0.030 or less, more preferably 0.020 or less, daringly 0.015 or less), an increase in the initial resistance can be restrained to a minimum. The reason thereof is presumably as follows: the ratio mc/mb can be appropriately reduced by ensuring a wider remaining space volume V relative to the molar content A of the LiBOB. That is, it is presumed that, when a wide remaining space volume V is ensured, oxalate ions in the film formed on the surface of the negative electrode are smoothly removed from the film as carbon dioxide, thereby resulting in that the molar content mc of the carbonate ion in the film is decreased. Meanwhile, in Example 1, Example 9, Example 13, and Example 14, the ratio mc/mb was increased, and the reaction resistance ratio was relatively high. The reason thereof is presumably as follows: since a sufficient remaining space volume V was not ensured in the battery case, oxalate ions in the film formed on the surface of the negative electrode could not be removed as carbon dioxide, thereby resulting in that the oxalate ions remained in the film as high-resistance lithium carbonate.

TABLE 1

| $CO_3^{2-}$ ION MOLAR CONTENT mc (μmol/cm$^2$) | mc/mb | REACTION RESISTANCE (mΩ) | REACTION RESISTANCE RATIO (RELATIVE VALUE) | |
|---|---|---|---|---|
| 1.28 | 7.11 | 85.30 | 125.20 | EXAMPLE 1 |
| 0.88 | 4.89 | 71.20 | 104.51 | EXAMPLE 2 |
| 0.72 | 4.00 | 68.50 | 100.54 | EXAMPLE 3 |
| 0.63 | 3.50 | 68.25 | 100.18 | EXAMPLE 4 |
| 0.53 | 2.94 | 68.13 | 100.00 | EXAMPLE 5 |
| 0.22 | 3.14 | 57.20 | 98.96 | EXAMPLE 6 |
| 0.21 | 3.00 | 58.00 | 100.35 | EXAMPLE 7 |

TABLE 1-continued

| | | | | |
|---|---|---|---|---|
| 0.22 | 3.14 | 57.80 | 100.00 | EXAMPLE 8 |
| 2.33 | 5.83 | 100.20 | 127.97 | EXAMPLE 9 |
| 0.85 | 2.13 | 80.00 | 102.17 | EXAMPLE 10 |
| 0.82 | 2.00 | 78.20 | 99.87 | EXAMPLE 11 |
| 0.73 | 1.78 | 78.30 | 100.00 | EXAMPLE 12 |
| 5.13 | 6.18 | 142.00 | 135.24 | EXAMPLE 13 |
| 4.98 | 6.00 | 135.00 | 128.57 | EXAMPLE 14 |
| 2.8 | 3.41 | 105.00 | 100.00 | EXAMPLE 15 |

| | REMAINING SPACE VOLUME ($cm^3$) | LiBOB CONCENTRATION (mol/kg) | FILLING AMOUNT (g) | LiBOB CONTENT A (mmol) | A/V ($mmol/cm^3$) | B ATOM MOLAR CONTENT mb ($\mu mol/cm^2$) |
|---|---|---|---|---|---|---|
| EXAMPLE 1 | 10 | 0.023 | 40 | 0.92 | 0.092 | 0.18 |
| EXAMPLE 2 | 30 | 0.023 | 40 | 0.92 | 0.031 | 0.18 |
| EXAMPLE 3 | 50 | 0.023 | 40 | 0.92 | 0.018 | 0.18 |
| EXAMPLE 4 | 70 | 0.023 | 40 | 0.92 | 0.013 | 0.18 |
| EXAMPLE 5 | 90 | 0.023 | 40 | 0.92 | 0.010 | 0.18 |
| EXAMPLE 6 | 10 | 0.01 | 40 | 0.4 | 0.040 | 0.07 |
| EXAMPLE 7 | 50 | 0.01 | 40 | 0.4 | 0.008 | 0.07 |
| EXAMPLE 8 | 90 | 0.01 | 40 | 0.4 | 0.004 | 0.07 |
| EXAMPLE 9 | 10 | 0.05 | 40 | 2 | 0.200 | 0.4 |
| EXAMPLE 10 | 40 | 0.05 | 40 | 2 | 0.050 | 0.4 |
| EXAMPLE 11 | 50 | 0.05 | 40 | 2 | 0.040 | 0.41 |
| EXAMPLE 12 | 90 | 0.05 | 40 | 2 | 0.022 | 0.41 |
| EXAMPLE 13 | 10 | 0.12 | 40 | 4.8 | 0.480 | 0.83 |
| EXAMPLE 14 | 50 | 0.12 | 40 | 4.8 | 0.096 | 0.83 |
| EXAMPLE 15 | 90 | 0.12 | 40 | 4.8 | 0.053 | 0.82 |

The present invention has been described in detail as above, but the above embodiment and examples are just examples. The invention described herein includes embodiments obtained by variously modifying or altering the concrete embodiments exemplified as above.

The invention claimed is:

1. A nonaqueous electrolyte secondary battery comprising:
   a positive electrode;
   a negative electrode;
   a nonaqueous electrolyte; and
   a battery case configured to accommodate the positive electrode, the negative electrode, and the nonaqueous electrolyte,
   the nonaqueous electrolyte including lithium bis(oxalate) borate at least at a time of assembly of the nonaqueous electrolyte secondary battery,
   the negative electrode including a film derived from the lithium bis(oxalato)borate and the film containing a boron atom and a carbonate ion,
   a ratio of a molar content of the carbonate ion to a molar content of the boron atom being equal to or less than 4.89, and
   a ratio of A to V being equal to more than 0.001, but less than 0.053 at the time of the assembly, where A is defined as a molar content of the lithium bis(oxalate) borate and a unit of the molar content is millimole, V is defined as a remaining space volume in the battery case and a unit of the remaining space volume is cubic centimeter, A is about 0.1 mmol to 10 mol, and V is 10 $cm^3$ to 90 $cm^3$.

2. The nonaqueous electrolyte secondary battery according to claim 1, wherein:
   the ratio of the molar content of the carbonate ion to the molar content of the boron atom is equal to or less than 4.00.

3. The nonaqueous electrolyte secondary battery according to claim 1, wherein:
   a ratio of A to V is equal to or less than 0.020 at the time of the assembly, where A is defined as a molar content of the lithium bis(oxalate)borate and a unit of the molar content is millimole, and V is defined as a remaining space volume in the battery case and a unit of the remaining space volume is cubic centimeter.

4. The nonaqueous electrolyte secondary battery according to claim 2, wherein:
   a ratio of A to V is equal to or less than 0.020 at the time of the assembly, where A is defined as a molar content of the lithium bis(oxalate)borate and a unit of the molar content is millimole, and V is defined as a remaining space volume in the battery case and a unit of the remaining space volume is cubic centimeter.

5. The nonaqueous electrolyte secondary battery according to claim 1, wherein A is about 0.5 mmol to 5 mol.

* * * * *